United States Patent [19]
Musashi et al.

[11] Patent Number: 5,751,980
[45] Date of Patent: May 12, 1998

[54] METHOD AND SYSTEM FOR DISPLACING A DIALOGUE BOX

[75] Inventors: Kazuyuki Musashi, Kanagawa-ken; Hiroshi Morishima, Yamato, both of Japan

[73] Assignee: International Business Machines Corp., Armonk, N.Y.

[21] Appl. No.: 547,638

[22] Filed: Oct. 24, 1995

[30] Foreign Application Priority Data

Oct. 25, 1994 [JP] Japan ................................ 6-258630

[51] Int. Cl.$^6$ ................................................ G06F 3/00
[52] U.S. Cl. ................................ 395/354; 395/975
[58] Field of Search ........................ 395/146, 155, 395/156, 157, 159, 347, 339, 352, 353

[56] References Cited

U.S. PATENT DOCUMENTS

| | | | |
|---|---|---|---|
| 5,339,392 | 8/1994 | Risberg et al. | 395/161 |
| 5,450,539 | 9/1995 | Ruben | 395/155 |
| 5,481,712 | 1/1996 | Silver et al. | 395/700 |
| 5,508,909 | 4/1996 | Maxwell et al. | 364/147 |
| 5,524,201 | 6/1996 | Shwarts et al. | 395/161 |

*Primary Examiner*—Mark R. Powell
*Assistant Examiner*—A. Katbab
*Attorney, Agent, or Firm*—Edward H. Duffield

[57] ABSTRACT

A method and system for preparing dialogue boxes that requires only simple coding and does not depend on the use of complicated procedures, such as the calculation of position coordinates. To eliminate the selection of display items that can be automatically assigned, items are selected from the top, and an "OK" button and a "CANCEL" button are assumed always to be present.

26 Claims, 4 Drawing Sheets

FIG. 1

| | Search for character row |
|---|---|

Characters to be searched for

| |
|---|

☐ Distinguish upper case from lower case

☐ Distinguish half size from normal size

| O K | | Cancel |
|---|---|---|

FIG. 2

| | Replace character row |
|---|---|

Characters to be searched for

| |
|---|

Replacement characters

| |
|---|

☐ Distinguish upper case from lower case

☐ Distinguish half size from normal size

☐ Replace all pertinent character rows

| O K | | Cancel |
|---|---|---|

FIG. 3
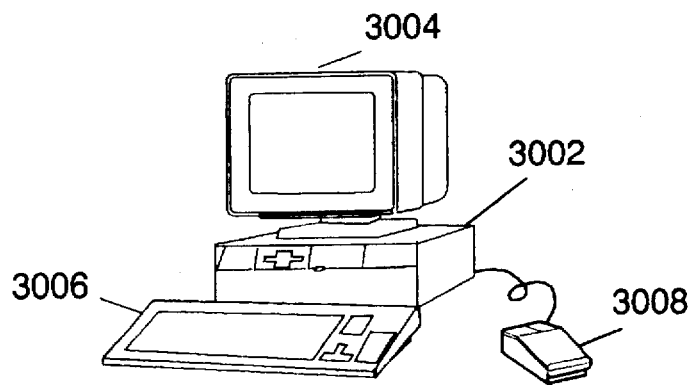
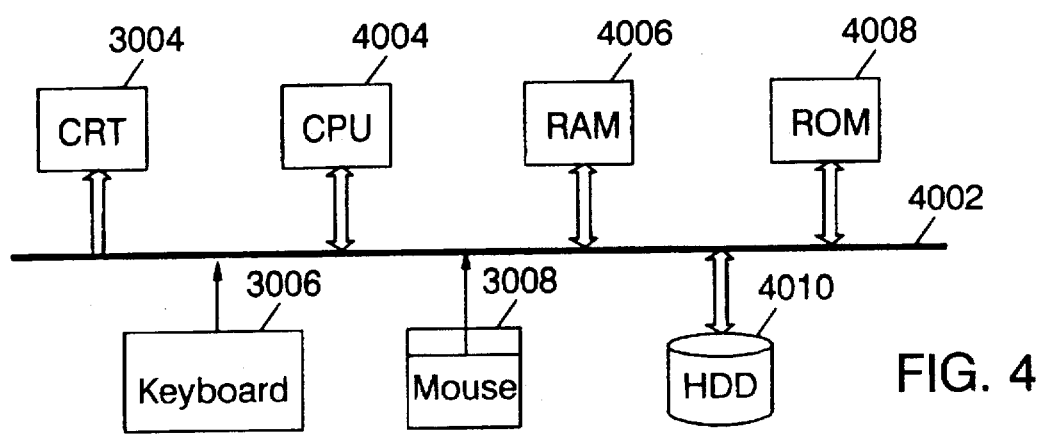
FIG. 4
FIG. 5
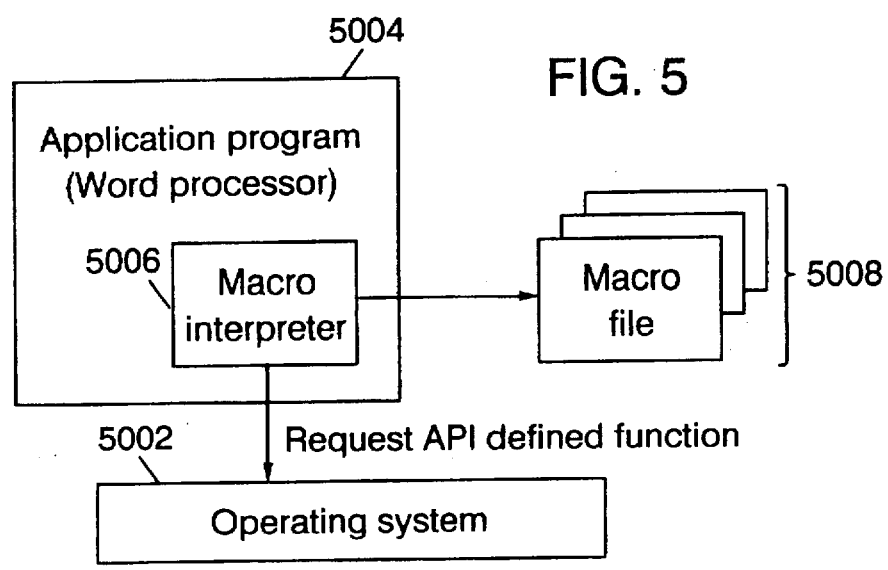

METHOD AND SYSTEM FOR DISPLACING A DIALOGUE BOX

FIELD OF THE INVENTION

The present invention relates to a system and a method for generating or customizing dialogue boxes that are employed for an application program that is mainly run in a multi-window environment.

DESCRIPTION OF THE PRIOR ART

As the performances of computers are being improved and personal computers and work stations are becoming more popular, computer hardware systems that have a multi-task and multi-window operating system, such as OS/2 (IBM Trademark), Windows (Microsoft Trademark), or X-Window System (MIT Trademark), are generally being used.

Some application programs, such as word processors and spreadsheet programs, which run under such operating systems and perform a dialogue process with a user, need to display screens so that users may enter desired characters or select desired items. In a multi-window environment that is based on a bit mapped display, it is especially difficult to separately prepare resources and design screens for dialogues. Therefore, in general, an operating system includes an independent API defined function that displays elements, such as text input areas, radio buttons, and check boxes, that are employed for dialogues with users. An application program only calls, as needed, an arbitrary API defined function using a predetermined argument. A screen, for dialogue with users, that consists of an assembly of the above elements is normally displayed as an individual window and is also called a dialogue box.

A programmer who is working on an application program can employ these elements to prepare in advance a plurality of dialogue boxes for dialogues with users that involve comparatively less human effort.

As the functions and applications of the application program are increased, standard dialogue boxes that are prepared by a programmer sometimes are insufficient to satisfy the demands of users.

Therefore, application programs that enable users to prepare dialogue boxes and that include macro languages that can be customized have been provided.

For some macro languages, a series of statements such as those below is used to prepare and display dialogue boxes that resemble the one that is shown in FIG. 1.

TABLE 1

Dialog(Title, PosX1, PosY1, Width1, Height1) // frame
Text(Text1, PosX2, PosY2, Width2, Height2, ID1) // Character to be searched for
EditLine(Def1, Field1, PosX3, PosY3, Width3, Height3, ID2) // input box
CheckBox(Text2, Def2, Field2, PosX4, PosY4, Width4, Height4, ID3) // upper case button
CheckBox(Text3, Def3, Field3, PosX5, PosY5, Width5, Height5, ID4) // upper case button
PushButton(Text4, Field4, PosX6, PosY6, Width6, Height6, ID5) // OK button
PushButton(Text5, Field, PosX7, PosY7, Width7, Height7, ID6) // cancel button
Ret = Show() // display The statements, Dialog() and Text(), are functions that are prepared in a macro language, and the statements following // are comments. Title, PosX1, and PosY1 are parameters for variables that are provided as arguments for a function. Especially, the variables PosX1, PosX2, . . . and PosY1, PosY2, . . . represent position coordinates. In the above example, Title="Replace character sequence," and, for example, PosX1=0 and PosY1=10. The name of a variable into which a value is substituted in advance may be entered as an argument for a function, or, as is shown in Dialog ("Replace character sequence"), a value may be entered directly as an argument.

These macro statements are prepared either by using a dedicated dialog preparation tool, or by a user directly writing the statements described above by calculating position coordinates. In either way, it is very difficult to visualize the resultant dialog box. Further it is difficult to understand the macro statements when they are read later.

Another disadvantage of the description for preparing the dialogue box is as follows. Assume that a user desires to alter the dialogue box in FIG. 1 to the one shown in FIG. 2. Three lines are added to the above described statements, so that the resultant statements in macro language to obtain the dialogue box in FIG. 2 are as shown below.

TABLE 2

Dialog(Title, PosX1, PosY1, Width1, Height1) // frame
Text(Text1, PosX2, PosY2, Width2, Height2, ID1) // Character to be searched for
EditLine(Def1, Field1, PosX3, PosY3, Width3, Height3, ID2) // input box
Text(Text6, PosX8, PosY8, Width8, Height8, ID7) // Replacement character (added line)
EditLine(Def3, Field6, PosX9, PosY9, Width9, Height9, ID8) // input box (added line)
CheckBox(Text2, Def2, Field2, PosX4, PosY4, Width4, Height4, ID3) // upper case button
CheckBox(Text7, Def3, Field3, PosX5, PosY5, Width5, Height5, ID4) // upper case button
CheckBox(Text3, Def4, Field6, PosX10, PosY10, Width10, Height10, ID9) // Replace all pertinent characters (added line)
PushButton(Text4, Field4, PosX6, PosY6, Width6, Height6, ID5) // OK button
PushButton(Text5, Field5, PosX7, PosY7, Width7, Height7, ID6) // cancel button
Ret = Show() // display However, the dialogue box shown in FIG. 2 can not be obtained only by adding these three lines, as at least PosY1 and PosY3 through PosY7 must be changed. Because the size in the vertical direction that is required for a dialogue box is increased as new lines are added to the dialogue box, arguments that correspond to Y coordinates in all the statements following the added lines must be changed.

It is therefore an object of the present invention to provide a method and a system for preparing dialogue boxes that requires only simple coding and does not depend on the use of complicated procedures, such as the calculation of position coordinates.

It is another object of the present invention to provide a method and a system for preparing dialogue boxes, that requires only the minimum human effort to increase and decrease the number of items that are displayed in dialogue boxes.

SUMMARY OF THE INVENTION

These objects are achieved by automatic assignment techniques of display items for a dialogue box according to the present invention.

More specifically, according to the present invention, to eliminate the selection of display items that can be automatically assigned, the following system is employed for the designation of display items:

(1) The items are selected from the top. The absolute designation of position coordinates is therefore unnecessary.

(2) Preferably, an OK button and a cancel button are assumed to be present from the beginning.

BRIEF DESCRIPTION OF THE DRAWING

FIG. 1 is a diagram showing an example of a dialogue box.

FIG. 2 is a diagram showing another example of a dialogue box.

FIG. 3 is a diagram illustrating the outline of a system according to the present invention.

FIG. 4 is a block diagram illustrating the arrangement of a system of the present invention.

FIG. 5 is a diagram showing the calling relationship of an operating system, an application program, and a macro file.

DESCRIPTION OF THE PREFERRED EMBODIMENTS

Figure 6:
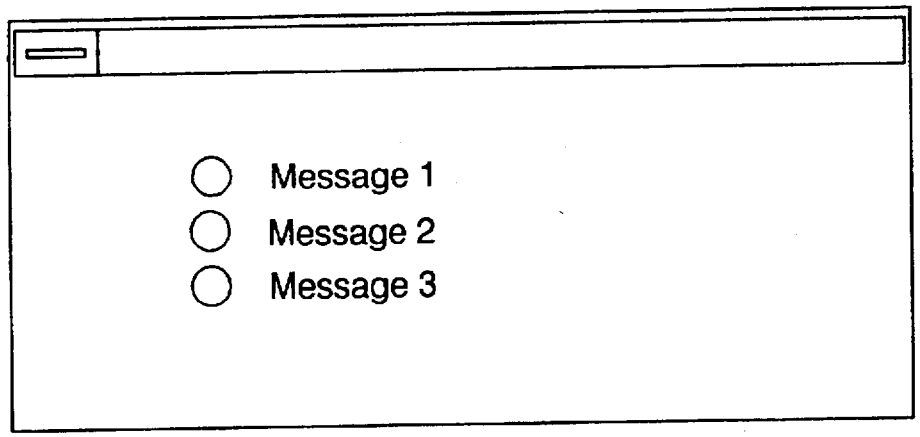
FIG. 6 is a diagram showing a radio button example.

The preferred embodiment of the present invention will now be described while referring to the accompanying drawings.

A. Hardware arrangement

In FIG. 3 is shown the hardware arrangement for executing the present invention. This arrangement includes a system apparatus 3002, which incorporates a CPU, a RAM, a ROM, a hard disk, a disk drive, and various control boards, a CRT 3004, which preferably is an APA device (a CRT with a color bit mapped display whereon each dot on the screen can be controlled), a keyboard 3006 which is employed for the key input of various commands and characters to the system apparatus 3002, and a mouse 3008, which is used to point at an arbitrary location on the display screen of the CRT 3004 and to input the position coordinates for the point to the system apparatus 3002.

B. System arrangement

FIG. 4 is a block diagram illustrating the system components that constitute the hardware in FIG. 3. In FIG. 4, the CRT 3004, the keyboard 3006, and the mouse 3008 shown in FIG. 3 are connected to a bus 4002. Further, connected to the bus 4002 are a processor (CPU) 4004, which performs computation and input/output control, a random access memory (RAM) 4006, which provides a main storage area for loading an operating system and an application program, a read only memory (ROM) 4008, in which is stored a BIOS that includes an IPL and a basic input/output routine, and a hard disk (HDD) 4010, on which are stored various applications, such as an operating system, a spreadsheet, a database, a word processor, and a text editor, and which provides an area for swapping data with a main storage area when an operating system supports a virtual storage function.

The operating system that is stored in the HDD 4010 in this embodiment is OS/2 (IBM Trademark), but another operating system, such as Windows (Microsoft Trademark) or the X-Window System (MIT Trademark), may be employed. The operating systems with which the present invention can be employed are not limited to he ones named, but operating systems that have bit mapped display functions are preferable, and the ones that support multi-window environments are the most preferable.

Although not absolutely necessary, it is desirable that an operating system that is employed in this invention have an API that defines, as standard, a function that can display items, which are elements that are used to prepare dialogue boxes, such as a text display area, a text input area, a check box, a radio button, and a combo box. OS/2, Windows, and X-Window System are operating systems that meet the above requirements.

C. Calling a function

FIG. 5 is a schematic diagram showing the individual components involved in a dialogue box display process according to the present invention.

In FIG. 5, when the system is activated an operating system 5002, which has various API defined functions, is loaded from the HDD 4010 to the RAM 4006. As described above, the operating system in this embodiment is OS/2.

An application program 5004 is loaded above the operating system 5002. The application program 5004 in this embodiment is a word processor program. The application program 5004 is normally stored on the HDD 4010. The word processor program 5004 includes the feature of the present invention, i.e., has at the least a function that a user can employ to customize a dialogue box.

In this embodiment, the word processor program 5004 includes a macro execution function, and the preparation and alteration of a user defined dialogue box can be accomplished as a macro program. The word processor program 5004 therefore incorporates a macro interpreter 5006 in, for example, a dynamic library routine (DLL) form.

One or more macro files 5008 are stored in a directory on the HDD 4010 that the word processor program 5004 assumes to be, or that a user designates as the source directory. To call the stored macro file 5008, the file name of a desired macro file may be entered by keying it in, or keys may be assigned in advance so that the simultaneous depression of a set of specific keys, such as a control key and a K key, calls up a predetermined macro file.

In this embodiment, the macro file 5008 in the execution form is a plain text file that is prepared and edited by a text editor. In some application programs, the macro file in the execution form, however, can be a file in a predetermined binary form that is obtained by employing a related macro compiler to convert a macro source file into a text form.

The macro language used in this embodiment to write the macro file 5008 has a syntax that is similar to a procedure oriented language, such as BASIC or the C language. That is, the macro language supports conditional branches, such as if . . . then . . . else . . . endif and switch() . . . case . . . case . . . endswitch, repetitions of while() . . . endwhile, substitution of a value, such as i=2, or a character row variable, such as text="Tokyo."

Further, with the macro language, almost all the functions, including the retrieval of documents to be edited by a word processor, the saving of a document that is being edited, the search for and the replacement of characters in a document that is being edited, and the generation of a dialogue box according to the present invention, are written in a function call form. As is shown in FIG. 5, such a function call form is converted, as needed, by the macro interpreter 5006 of the word processor 5004 into an API defined function call form for an operating system, and the actual process is performed by the API defined function that is called. A dialogue box display function, which is the subject of the present invention, will now be described in detail, but since the other functions used with the macro language are not related directly to the processing of the present invention, an explanation for them will not given here.

D. Dialogue box display function

A dialogue box display function in this embodiment has the following form.

TABLE 3

Ret = AutoDialog(Title, Width,
    ItemA, OptA1, OptA2,
    ItemB, OptB1, OptB2, . . .)

In the above statement, Title is the title of a dialogue box (it corresponds to "Search for character row" in FIG. 1), and Width is the width of a dialogue box.

One displayed item includes three elements: item name, option 1, and option 2. In the above statement, the set ItemA, OptA1, and OptA2, and the set ItemB, OptB1, and OptB2 each include these three elements.

In this embodiment, "Text," "Editline," "EditInt," "EditFloat," "CheckBox," "RadioButton," "EndRadioButton," and "ComboBox" are employed as item names.

"Text" is a simple text message in a check box. When this is selected as an item name, the contents of a text message, which is to be actually displayed, or a variable that points to a text message is stored in option 1. At this time, option 2 is 0.

"Editline" provides an input box for a user to enter a character row therein. When this is selected as an item name, deleted characters are stored in option 1. When no characters are selected as a deleted character row, Nil is stored in option 1. Option 2 is 0.

"EditInt" provides an input box for a user to enter an integer value. When this is selected as an item name, deleted integer values are stored in option 1. When no integer values are selected as deleted integer values, Nil is stored in option 1. Option 2 is 0.

"EditFloat" provides an input box for a user to enter the value of a real number. When this is selected as an item name, omitted values of real numbers are stored in option 1. When no number values are selected as deleted real number values, Nil is stored in option 1. Option 2 is 0.

"CheckBox" provides a check box that is a rectangular area for clicking with a mouse and for which there is a succeeding text message. When this is selected as an item name, the contents of a text message that is to be actually displayed, or a variable (pointer) that points to a text message is stored in option 1. While a check box is simply a blank rectangle when nothing is selected therein, by the clicking with a mouse, a "X" is entered in the rectangle, which is selected in this manner. When 0 is stored in option 2, the initial state of the check box is a non-selected state. When 1 is stored in option 2, the initial state of the check box is a selected state.

"RadioButton" provides a small circular radio button for clicking with a mouse, and displays a succeeding text message. When this is selected as an item name, the contents of a text message that is actually displayed, or a variable (pointer) that points to a text message is stored in option 1. While the radio button is simply a blank circle in the non-selected state, by clicking with the mouse, a black dot is entered in the circle, which is selected in this manner. When 0 is stored in option 2, the initial state of the radio button is the non-selected state. When 1 is stored in option 2, the initial state of the radio button is the selected state. Generally, unlike the check box, a plurality of radio buttons are listed and alternatively selected by a user. For the listing of the radio buttons, item name "EndRadioButton" is also used. The examples of radio buttons are as follows.

TABLE 4

Ret = AutoDialog(Title, Width, . . .
    "RadioButton," "Message1," 0,
    "RadioButton," "Message2," 0,
    "RadioButton," "Message3," 0,
    "EndRadioButton,"   0, 0, . . .)

A radio button group for a dialogue box that is thus prepared is as shown in FIG. 6. When 1 is entered in option 2 of one of radio buttons, the initial state of the radio button is the selected state. When 1 is entered mistakenly in option 2 of a plurality of radio buttons, the macro interpreter may handle this simply as an error, or may interpret it to mean that all the radio buttons in the group are in the non-selected state and thereafter execute a process.

"ComboBox" is a combo box that permits a user to select one character row from a list in which is included a plurality of character rows. Character rows are entered into a character row list in advance. When "ComboBox" is selected as an item name, the character list name is stored in option 1. Option 2 is 0. The employment example for "combobox" is as follows:

TABLE 5

// character row list definition
List[1] = "U.S.A."
List[2] = "Japan"
List[3] = "England"
List[4] = "France"
List[5] = "Germany"
// end of character row list definition
Ret = AutoDialog(Title, Width, . . .
    "ComboBox," List, 0, . . .)

Figure 7:
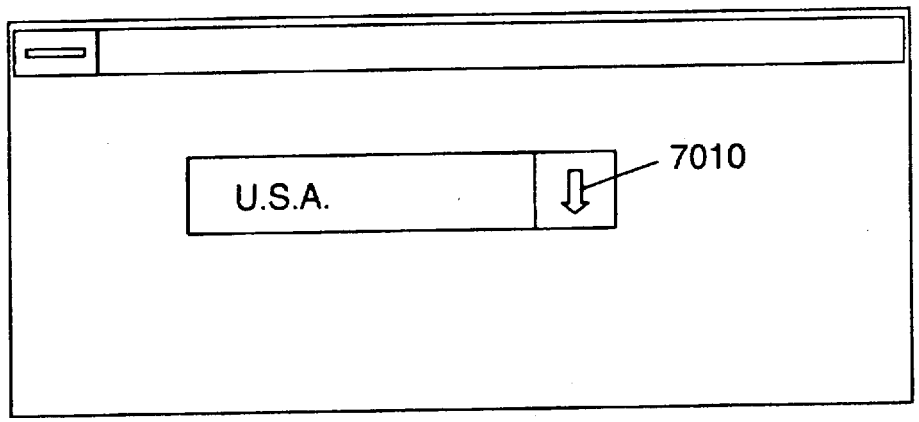
FIG. 7 is a diagram showing a combo box example.

The display thus prepared in a dialogue box is as shown in FIG. 7, where only "U.S.A.," the content of List [1], is indicated. When a item that is desired to be selected is "U.S.A.," the clicking with a mouse may be performed at the location of "U.S.A." When a desired item is other than that, a location 7010, which is indicated by the downward pointing arrow shown in FIG. 7, is clicked. In response to this, a pull down list appears as is shown in FIG. 8, and an item other than "U.S.A.," such as "Japan" or "England," can thereafter be selected.

Figure 8:
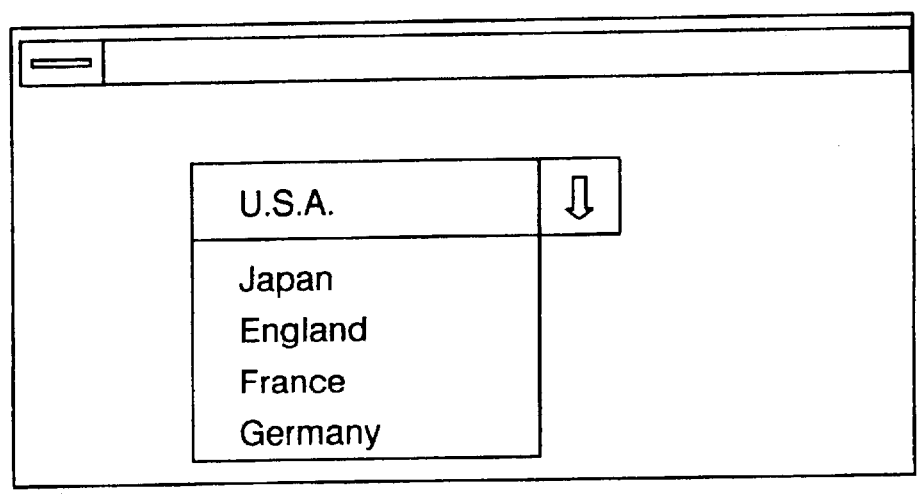
FIG. 8 is a diagram showing another combo box example.

Although for convenience sake they are not displayed in FIGS. 6, 7, and 8, in the preferred embodiment of the present invention, an "Ok" button and a "cancel" button are usually arranged in parallel at the bottom of a dialogue box that is generated by AutoDialog.

Data that are entered into, or selected from, a dialogue box that is thus generated are acquired as follows. When there is the following statement

TABLE 6

Ret = AutoDialog(Title, Width,
    ItemA, OptA1, OptA2,
    ItemB, OptB1, OptB2,
    ItemC, OptC1, OptC2,
    ItemD, OptD1, OptD2, . . . ), Ret is actually a row of variables. Data that are returned from items that are displayed by ItemA, OptA1, and OptA2 are stored in Ret[1]. Data that are returned from items that are displayed by ItemB, OptB1, and OptB2 are stored in Ret[2]. Data that are returned from an item that is displayed by ItemC, OptC1 and OptC2 are stored Ret[3]. The same procedures can be applied to other Rets.

As described above, there are, as item names, "Text," "Editline," "EditInt," "EditFloat," "CheckBox," "RadioButton," "EndRadioButton" and "ComboBox." Since when "Text" is employed as an item name only a message is displayed, Ret[i] is not assigned.

When the item name is "Editline," a value that is stored in Ret[i] is a pointer to a character row after it has been deleted, or is one that is entered by a user.

When the item name is "EditInt," a value that is stored in Ret[i] is an integer value after it has been deleted, or is one that is entered by a user.

When the item name is "EditFloat," a value that is stored in Ret[i] is a real number value after it has been deleted, or is one that is entered by a user.

When the item name is "CheckBox," a value that is stored in Ret[i] is 1 when a check box has been selected, or is 0 when a check box has not been selected.

When the item name is "RadioButton," a value that is stored in Ret[i] is a number of a selected radio button (the uppermost radio button is number one, and the following radio button is number two).

When the item name is "ComboBox," a value that is stored in Ret[i] is a pointer to a character row that is selected by a user.

When a dialogue box prepared by AutoDialog is terminated by clicking the "cancel" button, Nil is substituted into Ret. E. Processing flow The processing that is performed when the macro interpreter 5006 encounters a call for the AutoDialog function during the interpretation of a macro file will now be explained while referring to FIG. 9.

Figure 9:
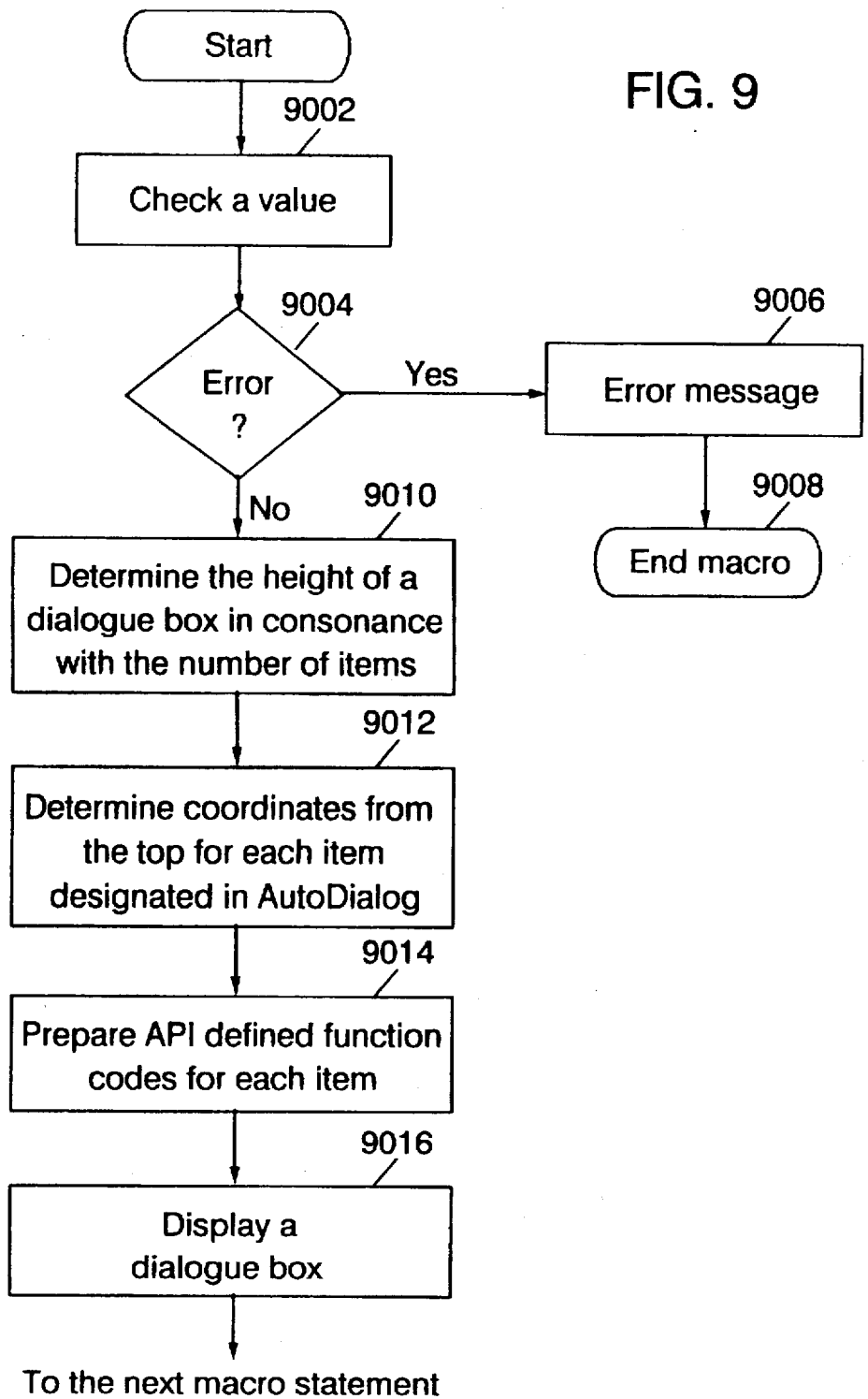
FIG. 9 is flowchart showing the processing for a preferred implementation of the present invention.

In FIG. 9, at step 9002, the value of an argument in the AutoDialog function is examined. Actually, in the following expressions,

TABLE 7

Ret = AutoDialog(Title, Width,
    ItemA, OptA1, OptA2,
    ItemB, OptB1, OptB2,
    ItemC, OptC1, OptC2, ... ), an examination is conducted to determine whether a value has mistakenly been entered in Title, and whether a character row has mistakenly been entered in Width. When ItemA is "Textline," it is examined if a value instead of a character string is designated in OptA1. When ItemB is "ComboBox," it is examined if a character row instead of a character row list is designated in OptB1. When ItemC is "RadioButton," it is examined if an argument that has "EndRadioButton" is thereafter missing.

The number of arguments must be a multiple of 3 except for the two that correspond to Title and Width. When (the number of arguments −2) is a whole number for which there is a remainder when it is divided by 3, it is regarded as an error.

Further, since the item names permitted in this embodiment are only "Text," "Editline," "EditInt," "EditFloat," "CheckBox," "RadioButton," "EndRadioButton," and "ComboBox," when any value other than these is entered into a location for an argument in which an item name should be stored, this is also regarded as an error.

In addition, when an excessively large value (e.g., 1500) is entered for Width, it is regarded as an error.

When, at 9004, a checked value is found to be an error, program control moves to step 9006. A message box that indicates there is a grammatical error in Autodialog is displayed on the message screen. At step 9008, a macro process is halted.

When, at step 9004, no grammatical error is found, program control advances to step 9010. The height of a dialogue box to be displayed is determined by the system based on the number of arguments. The width of the dialogue is provided prior to this when a value is entered into Width. It should be noted that in this embodiment, an OK button and a cancel button are arranged in parallel at the bottom of the dialogue box, regardless of the values and the number of arguments (see FIGS. 1 and 2). Therefore, a length for one additional item is added to the height of a dialogue box to be displayed in order to include the OK button and the cancel button.

One method for determining the height of a dialogue box to be displayed employs simply a value that is proportional to (the number of arguments −2)/3+1(+1 is for the OK button and the cancel button). Various heights may be determined in advance for each item name and the values of those heights may be added one after another.

At 9012, the coordinates of a display position are determined for each item. In this case, the reference point for coordinates is positioned at the upper left of a dialogue box. When the height of a dialogue box is determined simply in consonance with the number of items, a predetermined offset value may be added to the value of the Y coordinate for the uppermost item, and the obtained value may be a y coordinate value for that item.

When different heights are determined in advance for the item names, the predetermined values are employed as offset values, which are added to the y coordinate values.

Although the y coordinate of each item is offset in order, the x coordinate may be constant for all the items.

After the x coordinate and the y coordinate values are determined for all the items that are given as arguments for Autodialog, at step 9014, a code for calling a specific API defined function that corresponds to each item name is generated. Also prepared at step 9014 is Ret, which is a structure of variables that receives the values that are returned from items in a dialogue box.

At step 9016, a dialogue box is displayed that is based on the code that is prepared at step 9014 for calling the API defined function, and the system waits for a mouse click or key input by a user. In this embodiment, a dialogue box is displayed at a left upper position in a parent window (pertinent word processor program) on the screen. A dialogue box may be displayed in correlation with the cursor that is positioned with a mouse.

When, at step 9016, the OK button is clicked, a value or a character string that is obtained from a corresponding item is stored in Ret, the structure that is composed of variables. If, at step 9016, the cancel button is clicked, Nil is stored in Ret. In either case, processing is shifted to the next statement of the macro program.

In the succeeding statements in the macro program, data that are input by a user via a dialogue box are acquired by Ret[1], Ret[2], ... to perform a specific process, such as the replacement of a character row or the calling of a new document.

F. Preparation and alteration example for a dialogue box The processing for changing a dialogue box when AutoDialog is employed will now be explained.

A dialogue box in FIG. 1 is written as follows according to the embodiment.

TABLE 8

| Ret = AutoDialog(Title, Width, | | | // frame |
|---|---|---|---|
| "Text," | Text1, | 0, | // character row to be searched for |
| "EditLine," | Nil, | 0, | // input box |
| "CheckBox," | Text2, | 0, | // upper case button |
| "CheckBox," | Text3, | 0) | // half size button |

Although specific data, such as Text1="character row for search", are actually set, it should be understood that statements for setting such specific values are omitted for convenience sake.

As is apparent from the above statement, according to the present invention, the designation of a coordinate value is not required to display a dialogue box.

Since in many cases, the "Ok" button and the "cancel" button, which are requisites, are automatically added in a dialogue box without writing their corresponding codes, the human effort that is required to write a macro for the display of a dialogue box is greatly reduced.

When the above statement is rewritten to display a dialogue box in FIG. 2,

TABLE 9

| Ret = AutoDialog(Title, Width, | | | // frame |
|---|---|---|---|
| "Text," 0, | Text1, | | // character row to be searched for |
| "EditLine," | Nil, | 0,// | input box |
| "Text," 0, | Text4, | | // replacement character row (added)✓ |
| "EditLine," | Nil, | 0,// | input box (added) |
| "CheckBox," | Text2, | 0, | // upper case button |
| "CheckBox," | Text3, | 0, | // half size button |
| "CheckBox," | Text5, | 0) | // total replacement (added) |

As is apparent, only lines with a comment (added) are added to the previous statement, and the other lines are not changed at all.

The deletion of items is much easier. Unnecessary lines are merely deleted, or simply commented out.

As described above, according to the present invention, since a dialogue box is automatically generated by simply arranging items as arguments for a dialogue box display function, processes, such as the calculation of the display positions of items, are not required, and the efficiency with which dialogue boxes are prepared is substantially improved.

When the addition or deletion of items is necessary after a dialogue box has been prepared, an argument that designates an item is merely added or deleted and no changes to the other sections is required. Thus, only the least human effort is necessary for the addition and deletion of the items in a dialogue box.

Although in the embodiment, a dialogue box has been prepared by employing the macro language of a word processor, application programs with which the present invention can be employed are not limited to word processors, and the present invention can be employed with arbitrary application programs, such as text editors, spreadsheets, or database programs, that can prepare dialogue boxes that can be customized by users.

In the above embodiment, to display items, such as a radio button and a check box, it is necessary to call the API defined function of the operating system. However, instead of having to call of the API defined function, an application program may have an internally provided capability to display items, such as a radio button and a check box, and may display these items independently.

Further, although the premise of the explanation of the embodiment has been that a bit mapped display based multi-window environment is employed, such an environment is not a requisite for the present invention. Even in a character-based environment, the present invention may be employed with an application program that can prepare a dialogue box that can be customized by a user.

What is claimed is:

1. A computer implemented dialogue box display method for displaying a dialogue box, which is employed by a user to enter data into a computer, on a screen of a display device that is connected to said computer, comprising the steps of:

(a) designating in order a plurality of items to be displayed in a dialogue box;

(b) offsetting positioning coordinates by a predetermined value in said order in which said plurality of items are designated, and automatically determining position coordinates for each of said plurality of items that are to be displayed in said dialogue box; and, (c) when said positioning coordinates for each of said plurality of items are determined, displaying on said screen a dialogue box in which said plurality of items are positioned at said determined coordinates.

2. The dialogue display method according to claim 1, wherein the offsets of said positioning coordinates are provided so that said plurality of items are arranged in order from top to bottom on said screen.

3. The dialogue display method according to claim 1, further comprising the steps of:

automatically displaying in said dialogue box a first button for input data confirmation and a second button for input data cancellation;

transmitting to said computer confirmation for data that are entered in said dialogue box by pointing at said first button with pointing means; and, cancelling data entered in said dialogue box by pointing at said second button with pointing means.

4. The dialogue display method according to claim 3, wherein said pointing means is a mouse and said pointing is effected by clicking said mouse.

5. The dialogue display method according to claim 1, wherein said plurality of items are selected from a text box, an input box, a check box, a radio button, and a combo box.

6. A computer implemented dialogue box display method for displaying a dialogue box, which is employed by a user to enter data into a computer, on a screen of a display device that is connected to said computer, comprising the steps of:

(a) calling an application program having a macro execution function;

(b) in response to a predetermined operation of said application program, loading a macro execution code that includes a display function for said dialogue box that is formed by sequentially designating a plurality of items in an order;

(c) offsetting positioning coordinates by a predetermined value following the order that is designated in said macro execution code, and automatically determining position coordinates for each of said plurality of items that are to be displayed in said dialogue box; and, (d) when said positioning coordinates for each of said plurality of items are determined, displaying on said screen a dialogue box in which said plurality of items are positioned in consonance with said determined coordinates.

7. The dialogue display method according to claim 6, wherein the offsets of said positioning coordinates are provided so that said plurality of items are arranged in order from top to bottom on said screen.

8. The dialogue display method according to claim 6, further comprising the steps of:

automatically displaying in said dialogue box a first button for input data confirmation and a second button for input data cancellation;

transmitting to said computer confirmation for data that are entered in said dialogue box by pointing at said first button with pointing means; and, cancelling data entered in said dialogue box by pointing at said second button with pointing means.

9. The dialogue display method according to claim 8, wherein said pointing means is a mouse and said pointing is effected by clicking said mouse.

10. The dialogue display method according to claim 6, wherein said plurality of items are selected from a text box, an input box, a check box, a radio button, and a combo box.

11. The dialogue display method according to claim 6, wherein said macro execution code is in a text file form.

12. The dialogue display method according to claim 11, wherein said dialogue box display function is written in a function call form.

13. The dialogue display method according to claim 12, wherein said order in which said plurality of items are designated is the order in which arguments are provided during function calling.

14. The dialogue display method according to claim 6, wherein said application program is a word processor.

15. The dialogue display method according to claim 6, wherein said application program is a spreadsheet program.

16. A dialogue box display system including a processor, a display device, a main memory, data input means including pointing means, means for storing an operating system and at least one application program, and means for loading said operating system and said application program into said main memory, and that displays on a screen of said display device a dialogue box into which a user enters data during execution of said application program, said system comprising:

(a) means for storing a code that is interpreted by a function interpreting means, and that includes a display function for a dialogue box that is constituted by sequentially designating a plurality of items;

(b) means for reading said code by employing a predetermined operation that is a function of said application program, for offsetting positioning coordinates by a predetermined value in the order that is designated in said code, and automatically determining individual positioning coordinates for said plurality of items that are to be designated in said dialogue box; and, (c) means for, when said positioning coordinates for said plurality of items are determined, displaying a dialogue box wherein said plurality of items are positioned on said screen at said predetermined positioning coordinates.

17. The dialogue display system according to claim 16, wherein said means (b) provides the offsets of said positioning coordinates so that said plurality of items are arranged in order from top to bottom on said screen.

18. The dialogue display method according to claim 16, further comprising:

means for automatically displaying in said dialogue box a first button for input data confirmation and a second button for input data cancellation;

means for transmitting to said computer confirmation for data that are entered in said dialogue box by pointing at said first button with said pointing means; and, means for cancelling data entered in said dialogue box by pointing at said second button with said pointing means.

19. The dialogue display system according to claim 18, wherein said pointing means is a mouse and said pointing is effected by clicking said mouse.

20. The dialogue display system according to claim 16, wherein said plurality of items are selected from a text box, an input box, a check box, a radio button, and a combo box.

21. The dialogue display system according to claim 20, wherein said operating system has an API defined function that is capable of displaying said text box, said input box, said check box, said radio button, and said combo box, and wherein said means for displaying said items in said dialogue box is accomplished by calling said API defined function.

22. The dialogue display system according to claim 16, wherein said code is in a text file form.

23. The dialogue display system according to claim 22, wherein said dialogue box display function is written in a function calling form.

24. The dialogue display system according to claim 23, wherein said order in which said plurality of items are designated is the order in which arguments are provided during function calling.

25. The dialogue display system according to claim 16, wherein said application program is a word processor.

26. The dialogue display system according to claim 16, wherein said application program is a spreadsheet program.

* * * * *